March 29, 1932.   V. J. CHAPMAN   1,851,563
WELDING APPARATUS
Filed Jan. 5, 1929   2 Sheets-Sheet 1
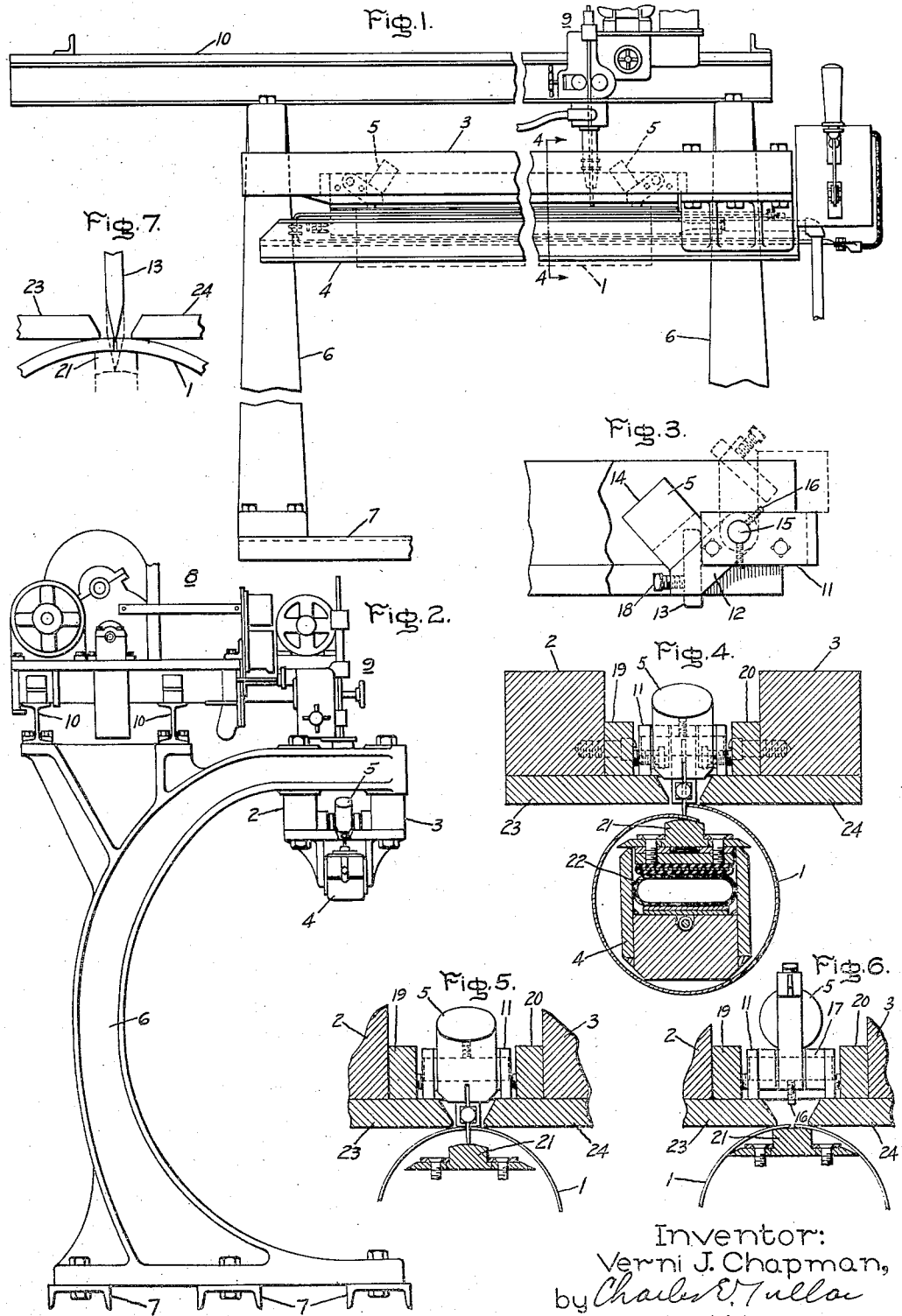

March 29, 1932.  V. J. CHAPMAN  1,851,563
WELDING APPARATUS
Filed Jan. 5, 1929  2 Sheets-Sheet 2
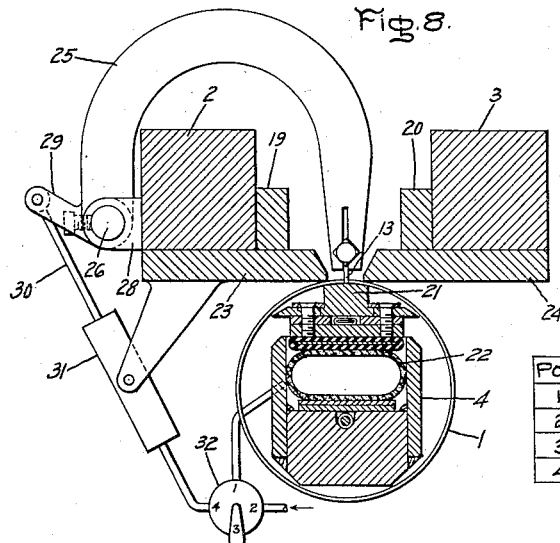
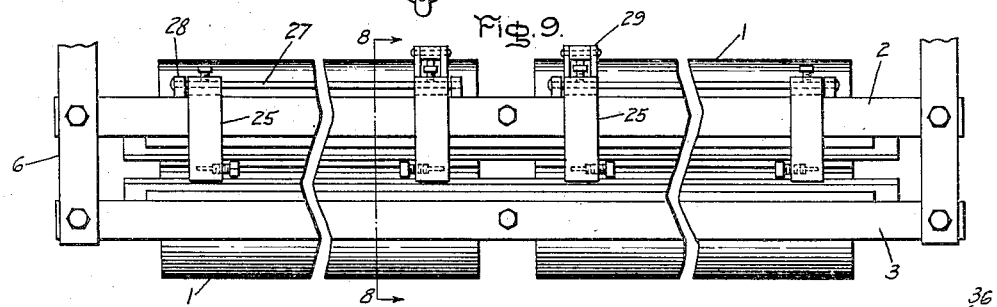
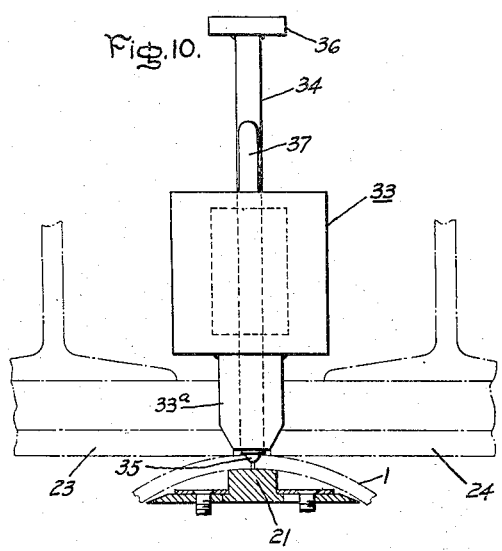
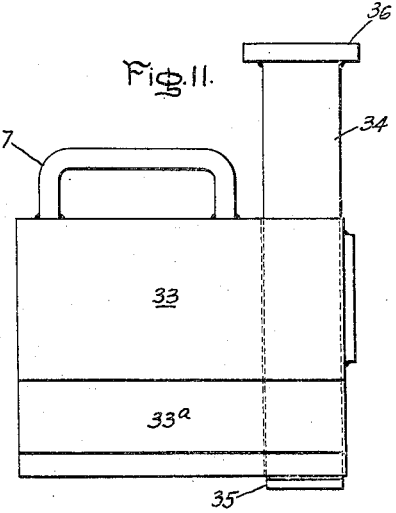
Inventor:
Verni J. Chapman,
by Charles E. Tullar
His Attorney.

Patented Mar. 29, 1932

1,851,563

UNITED STATES PATENT OFFICE

VERNI J. CHAPMAN, OF SCHENECTADY, NEW YORK, ASSIGNOR TO GENERAL ELECTRIC COMPANY, A CORPORATION OF NEW YORK

WELDING APPARATUS

Application filed January 5, 1929. Serial No. 330,684.

My invention relates to means for locating work parts in a welding machine with the seam between the parts coincident with the line of travel of a welding agency employed for welding the parts at the seam. Although of general application, I have illustrated my invention as applied to and constituting a part of welding machines used in welding the longitudinal seams of tank shells. In automatically welding tank shells it is necessary to bring the edges to be welded together or nearly together and to align the seam thus produced with respect to the travel of the welding agency employed in making the joint.

An object of my invention is to provide means for locating and holding the work parts and the seam therebetween in proper position in a welding machine relative to the line of travel of the welding agency employed for making the weld.

A further object of my invention is to provide means for spacing the work parts a predetermined distance from one another at the seam.

A further object of my invention is to provide an improved method of procedure for forming and welding tank shells.

My invention will be better understood from the following description when considered in connection with the accompanying drawings and its scope will be pointed out in the appended claims.

Referring to the drawings, Figs. 1 and 2 show side and end views of a welding machine embodying my invention and Figs. 3, 4, 5 and 6 show details of the device employed in this machine for locating and holding the work edges constituting the seam in proper position prior to clamping them in the machine. Fig. 3 is a side view of the particular locating device used in the machine illustrated, shown both in operative and inoperative positions, and Figs. 4, 5 and 6 are sectional views taken along the line 4—4 of Fig. 1 showing the relationship of the device to the work, as well as illustrating my improved method of procedure in making tank shells. Fig. 7 shows a modified form of the work engaging portion of my work centering and positioning device adapted for use with thin work where the spacing of the parts at the seam is quite close. Figs. 8 and 9 show end and plan views of the clamping mechanism of a welding machine with which is associated a modification of the work locating and aligning device of my invention, Fig. 8 being a sectional view along lines 8—8 of Fig. 9. Figs. 10 and 11 show end and side views of still another form of device according to my invention.

In the machine illustrated in Figs. 1 to 6 inclusive the work 1, shown as a tank shell, is clamped in place between members 2, 3 and 4 after the seam in the work has been centered relative to these members and aligned with the travel of the welding agency by devices 5. Members 2, 3 and 4 are attached to one another at their extreme right hand portions and are suspended from two vertical members 6 which with base members 7 constitute the frame of the welding machine. A carriage 8 on which is mounted a welding agency 9 is supported in the machine on a track 10 extending parallel to members 2, 3 and 4 and the work clamped therebetween. The track 10 is attached to the vertical members 6 as are the clamping members 2, 3 and 4 and when the work seam is properly located by devices 5 relative to members 2, 3 and 4 the welding agency 9 will travel along the seam in correspondence therewith while performing the welding operation. The welding agency employed in the machine illustrated is of a well known type adapted for feeding to the work a fusible electrode at a rate corresponding to its consumption in the arc. Since such devices are well known in the art and the particular form of welding agency employed is not essential to my invention, I will not further describe the construction of the particular agency illustrated.

The work positioning devices are shown in greater detail in Figs. 3, 4, 5 and 6. They comprise a bracket or yoke 11 at whose open end a latch 12 carrying a blade 13 and a weight 14 is pivotally supported on a pin 15 to which it is attached by a set screw 16. The latch 12 is supported at each side in the vicinity of the pivot pin by spacing members 17 which may be attached to the yoke 11 by welding or other suitable means. The blade 13, which is removable, is held in the free end of the latch 12 by means of a set screw 18. The thickness of the blade 13 will depend upon the desired spacing of the edges of the parts to be welded and will be different for different grades of work. Thus it is convenient to provide a plurality of blades 13 which may be inserted in the latch 12 in accordance with the work being performed in the machine.

In the illustrated machine the work positioning and aligning devices 5 are attached to members 2 and 3 through the agency of blocks 19 and 20 and so located relatively to the work that when the latch 12 is thrown back away from the work into an inoperative position, shown in dotted lines in Fig. 3, the total length of the seam in the work is uncovered so that the welding agency may travel from one end of the work to the other without meeting any obstruction. When the devices 5 are in the operative position shown in Fig. 1 the blades 13 will engage the work parts near the ends of the seam.

The method of operation is as follows: A steel plate is shaped by rolling or other means into a scroll, such as shown in Fig. 4, one longitudinal edge of which overlaps the other. This scroll is then placed about the lower beam 4 of the welding machine and the spacing and aligning devices 5 are thrown into the position shown in Fig. 1 which position is more clearly illustrated with regard to the work and clamping means in Fig. 4. One edge of the scroll is then placed against the blades 13 as shown in Fig. 4 and the other edge of the scroll is withdrawn from the position shown in Fig. 4 to the position shown in Fig. 5. During this operation the blades 13 act as stops for restraining one edge of the scroll while the other edge is being pulled into place. After the two edges of the scroll have been brought into alignment, thereby forming a cylinder, the blades 13 also act as spacing members separating the two edges by an amount equal to the thickness of the blade as shown in Fig. 5. A backing member or chill bar 21 supported in member 4 on a distensible hose 22 is then forced against the inside portion of the tank by inflating the hose and the parts are thus firmly clamped in adjusted position in the machine between the chill bar and holding members 23 and 24 attached to beams 2 and 3. The construction and arrangement of the clamping device illustrated is described in greater detail in my patent for Electric welding, No. 1,640,437, granted August 30, 1927, and assigned to the same assignee as the present case. After the backing member 21 has forced the work parts on each side of the seam against the holding members 23 and 24, the centering devices 5 may be thrown into the position shown in Figs. 3 and 6, thus leaving the work clamped in the desired position in the machine with the parts thereof separated the desired amount. The parts are thereafter united by traversing the welding agency along the seam thus formed and after the welding has been performed the clamp is released and the finished article withdrawn from the machine.

As has been noted above it is desirable to have available a plurality of blades 13 for different kinds of work. When welding thin parts the edges of each side of the seam are preferably spaced quite closely to one another. If blades 13 of a thickness corresponding to the desired spacing of the parts were used these blades would not be of sufficient strength to withstand the side pressures exerted on them while placing the work in the machine. Consequently I prefer to employ in such cases blades shaped as illustrated in Fig. 7. The blade there illustrated terminates in a feathered edge which becomes effective just prior to the time when the backing bar 21 firmly clamps the work 1 against the holding members 23 and 24. While the work is being adjusted in the machine the work edges engage the heavier portions of the blade above the feathered terminal as shown in dotted lines in this figure. After being thus adjusted the clamp is operated and the work lifted by backing bar 21 into engagement with holding members 23 and 24. Meanwhile the blade 13 is pushed from between the edges of the work parts in an upward direction and the feathered terminal of the blade 13 permits the work parts on each side of the seam to approach each other fairly closely before they are firmly clamped between parts 21, 23 and 24 of the welding machine.

In Figs. 8 and 9 I have illustrated the clamping mechanism of a machine similar in construction to that shown in Figs. 1 and 2. In the present instance however the clamping mechanism comprises two clamps such as shown in Figs. 1 and 2, these clamps being placed end to end, the point of attachment of members 2, 3 and 4 being at the center of the structure shown. By utilizing a plural clamp such as this it is possible to remove finished work and insert new work in one clamp while the welding agency is automatically welding the work held in the other clamp. It is however necessary to have in such case an unobstructed passageway for the welding agency along the whole length of the plural clamp and to attain this end I employ the modified form of my invention illustrated in these figures. The work positioning means in Figs. 8 and 9 comprises a plurality of semi-circular latches 25 pivotally attached at 26 to one of the clamping members 2. The free end of these latches is provided with a blade 13 which serves the same purpose as the blade 13 in the device shown in Figs. 1 to 6 inclusive. The shape of the latches and the method of attaching them to the frame of the machine is such that when they are swung back into an inoperative position the passageway between members 2 and 3 is left unobstructed and consequently the welding agency can be moved from one end of the plural clamp to the other without making vertical adjustments of the welding agency as would be necessary if the device shown in Figs. 1 to 6 were used. Devices such as shown in Figs. 8 and 9 are to be preferred to those shown in Figs. 1 to 6 when welding tanks or parts of different lengths.

In the arrangement illustrated in Figs. 8 and 9 the latches 25 are operated by mechanical means. As shown in Fig. 9 the latches associated with one clamp are attached to a common rod 27 supported in lugs 28 attached to member 2. This point of attachment determines the pivot point 26 which should be approximately at the same level as the seam so that the blades 13 will be moved by their latches in approximately a vertical direction from between the work parts at the seam. Attached to one of the latches or to the rod 27 on which they are mounted is an operating lever 29 connected by a link to an operating mechanism 31.

This operating mechanism is illustrated as a fluid operated piston in a cylinder to which the flow of operating fluid is controlled by a valve 32 which also controls the admission of operating fluid to the hose 22 by means of which the work clamp is operated. The valve has four operative positions in each of which the latch and clamp are controlled as indicated in the sequence diagram associated with Figs. 8 and 9. It is assumed in this diagram that air is the motive fluid. By moving the valve into its four positions the operation of the latches and clamp follow one another in the desired sequence for properly positioning and holding the work in the welding machine. Preferably the valve is constructed so that the valve handle is always moved in one direction, the four positions falling at the 0°, 90°, 180° and 270° positions.

The parts are illustrated in the positions they occupy when the valve is in its third position; that is the latches 25 are in their operative positions and the clamp closed about the work parts. Upon moving the valve 32 to its fourth position the latches are withdrawn from between the members 2 and 3, the clamp still remaining closed. The welding operation may now be performed. After this operation has been completed the valve is moved to its first position which releases the work clamp while still holding the latches 25 in their retracted or inoperative positions. The finished work may now be removed and new work inserted in the machine. The valve 32 is then placed in its second position which causes the latches to come into an operative position while the clamp is still open and the work freely movable therebetween. The work is then adjusted as described above in connection with Figs. 1 to 6 and when the work is as illustrated in Fig. 5 the valve is moved to its third position thereby closing the clamp while maintaining the latches 25 in operative position. This completes the cycle of operations which is repeated over and over again so long as the machine is in operation.

Instead of attaching the work spacing and aligning means to the machine it is possible to so construct it that it may be removed bodily from the machine. Such a device is shown in Figs. 10 and 11. As shown in these figures, the holding members 23 and 24 and the lower portion of the positioning and centering device 33a have complementary shapes so that when the device is inserted in the machine it assumes as definite a location relative to these members and the machine as if it were permanently attached thereto as in Figs. 1 to 9. The device per se comprises a body portion 33 of sufficient weight to hold it in position between the holding members 23 and 24 and a movable pin 34 the lower end of which 35 is given a shape corresponding to the groove between the work parts to be welded and the upper end of which is provided with a stop 36 to prevent it from falling through the body of the device when it is removed from the machine. A handle 37 is provided for lifting the device into and out of engagement with the holding members 23 and 24. The method of utilizing the device is as described above in connection with the latch device of Figs. 1 to 6.

In welding heavy parts in which the seam has already been determined by tack welding the parts at points along their length, the various devices above described may be used in aligning the seam in the machine relative to the line of travel of the welding agency. In such cases the work engaging portion of one of the devices will be inserted in the seam and while this part of the seam is held in correct position the work will be warped until another portion of the seam is brought into such position that the work engaging portion of another device may also be inserted in the seam. While the devices thus hold the seam in correct position relative to the welding agency the work is clamped in position and the devices are then removed for the performance of the welding operation. This centering operation is greatly facilitated by reason of the practice of notching the work at the seam in heavy work pieces to secure sufficient penetration of the parent metal during welding. The work engaging portion of the locating and centering devices may be readily inserted in the notch thus provided. It is of course apparent that the devices must be independently movable relative to one another when operating as just described. Consequently if latches such as shown in Figs. 8 and 9 are to be used for this operation they must be independently operable. For example one of the latches may be made freely movable relative to the bar 27 so that it may be hand manipulated.

It is apparent to those skilled in the art that various modifications of the described arrangements shown are possible without departing from the spirit and scope of my invention. Thus in Figs. 1 to 6 inclusive the pivoted members may be attached to any convenient part of the welding machine and in Figs. 8 and 9 latches 25 may be attached to beams 3 and 4 and members 6 as well as to beam 2. Likewise in connection with the device shown in Figs. 10 and 11 it is apparent that the bodily removable device described may be constructed in such manner that portions thereof will fit in brackets or holes in suitable parts of the machine instead of fitting between holding members 23 and 24.

The embodiments of the invention illustrated and described herein have been selected for the purpose of clearly setting forth the principles involved. It will be apparent, however, that the invention is susceptible of being modified in many ways to meet the different conditions encountered in its use and I, therefore, aim to cover by the appended claims all modifications within the true spirit and scope of my invention.

What I claim as new and desire to secure by Letters Patent of the United States is:

1. A clamp for engaging work parts on each side of the path of travel of a welding agency along said parts, and means for locating said work parts in said clamp, comprising a seam locating member for engaging the work parts between their edges at the seam to be welded, and means for supporting said member in definite relationship to said clamp movable from an operative position in the path of travel of said welding agency to an inoperative position out of the path of travel of said welding agency.

2. Welding apparatus comprising means for clamping a plurality of work parts, a welding agency, means for traversing said welding agency relatively to said clamping means along the surface of said work parts, and means for spacing and locating said work parts relatively to said welding agency, including a member shaped to engage the edges of the work parts and having a thickness equal to the desired spacing of the parts, and means for supporting said member in fixed relative position to said welding agency, said means being arranged to be removed from the path of travel of said welding agency along the surface of the work parts after they have been spaced, located and clamped relatively to said welding agency.

3. In a welding machine, means for clamping the work, means adapted to engage a seam to be welded in the work for locating said seam relatively to said clamping means, and means for operating said clamping and said seam locating means in predetermined sequence.

4. In a welding machine, means for clamping the work; means adapted to engage a seam to be welded in the work for locating said seam relatively to said clamping means; and means for controlling said means in the following sequence placing the seam locating means in operative position, closing the clamp, removing the seam locating means to inoperative position, and opening the clamping means.

5. In a welding machine in which the work is clamped between members arranged to engage one side of the work in back of a seam to be welded and the other side of the work on each side of said seam, a plurality of latches, means for pivotally supporting said latches from said members for movement into and out of engagement with the work, and means at the free end of said latches adapted to engage said seam for locating said work relatively to said clamping members.

6. In a welding machine in which the work is clamped between members arranged to engage one side of the work parts in back of a seam and the other side of the work parts on each side of said seam, a plurality of latches, means for pivotally supporting said latches from said members for movement into and out of engagement with the work, and means at the free end of said latches for engaging the edges of the work parts constituting the seam to be welded and spacing said edges a predetermined distance from one another.

7. A welding machine comprising a backing member for supporting the work along the seam to be welded, a welding agency, means for moving the welding agency along said backing member, and removable means supported in said machine in definite relationship to said backing member for aligning said seam relatively to said backing member and the travel of said welding agency, said means having a portion thereof arranged, when moved into operative position, to engage the backing member and constitute a stop against which the edges of the work may rest when being adjusted in the machine, and when moved into an inoperative position to clear the seam and work adjacent the same.

8. A welding machine comprising a backing member for supporting the work along the seam to be welded, a welding agency, means for moving the welding agency along said backing member, and removable means supported in said machine in definite relationship to said backing member for aligning the seam in the work relatively to said backing member and the travel of said welding agency, said means having a terminal portion arranged when moved in operative position to engage the backing member and constitute a stop against which the edges of the work may rest when being adjusted in the machine and being of sufficient thickness to space the edges of the work parts from one another a predetermined distance, and when moved into an inoperative position to clear the seam and the work adjacent the same.

9. A welding machine comprising a plurality of holding members adapted to engage one surface of the work parts on opposite sides of a seam between said parts, a backing member for backing up the seam along the opposite surface of said parts, means for moving said members relatively toward one another for clamping the work parts in position therebetween, a welding agency, means for moving the welding agency along the seam between the work parts, means for aligning the seam relatively to said holding and backing members and the welding agency, said means being supported in definite relationship to said holding members and having a movable element arranged to rest on said backing member and act as an abutment for the edges of the work parts being adjusted in the machine as well as a spacing means for determining the separation of the parts at the seam.

10. The method of making a welded tank shell which comprises shaping a sheet of metal into a scroll with the longitudinal edges overlapping one another a small amount, withdrawing the overlapped edges into spaced alinement, holding the edges in said spaced relationship, and thereafter welding the parts along the seam thus formed.

In witness whereof I have hereunto set my hand this 4th day of January, 1929.

VERNI J. CHAPMAN.